(12) United States Patent
Lee et al.

(10) Patent No.: US 11,645,024 B2
(45) Date of Patent: May 9, 2023

(54) RESUMING PRINT JOB BY USING ACCOUNTING INFORMATION

(71) Applicant: Hewlett-Packard Development Company, L.P., Spring, TX (US)

(72) Inventors: Hyunsuk Lee, Seongnam-si (KR); Hayoung Yoon, Seongnam-si (KR); Sung joon Hwang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/298,767

(22) PCT Filed: Jan. 9, 2020

(86) PCT No.: PCT/US2020/012852
§ 371 (c)(1),
(2) Date: Jun. 1, 2021

(87) PCT Pub. No.: WO2021/011026
PCT Pub. Date: Jan. 21, 2021

(65) Prior Publication Data
US 2022/0035586 A1    Feb. 3, 2022

(30) Foreign Application Priority Data

Jul. 15, 2019 (KR) .......................... 10-2019-0085093

(51) Int. Cl.
*G06F 3/12* (2006.01)

(52) U.S. Cl.
CPC ............ *G06F 3/1261* (2013.01); *G06F 3/121* (2013.01); *G06F 3/1273* (2013.01); *G06F 3/1288* (2013.01); *G06F 3/1272* (2013.01)

(58) Field of Classification Search
CPC ...... G06F 3/1261; G06F 3/121; G06F 3/1273; G06F 3/1288; G06F 3/1272
See application file for complete search history.

(56) References Cited

U.S. PATENT DOCUMENTS

| | | | |
|---|---|---|---|
| 10,116,826 B1 * | 10/2018 | Ravikiran | ............. G06F 3/1234 |
| 2003/0011805 A1 | 1/2003 | Yacoub | |
| 2005/0141013 A1 | 6/2005 | Kikuchi et al. | |

(Continued)

FOREIGN PATENT DOCUMENTS

| | | |
|---|---|---|
| JP | 2002182878 A | 6/2002 |
| JP | 2008216567 A | 9/2008 |

(Continued)

*Primary Examiner* — Huo Long Chen
(74) *Attorney, Agent, or Firm* — Brooks, Cameron & Huebsch, PLLC

(57) ABSTRACT

An example image forming apparatus includes a communication device to communicate with an external apparatus, a printing engine to perform a printing job, and a processor to, based on receiving a printing request for the printing job, perform accounting processing for the printing job, and control the printing engine such that the printing job is performed. The processor, based on an error occurring in the printing job, is to control the communication device to transmit proceeding history information of the printing job and accounting information to another image forming apparatus.

19 Claims, 8 Drawing Sheets

(56) References Cited

U.S. PATENT DOCUMENTS

| | | | |
|---|---|---|---|
| 2006/0233563 A1* | 10/2006 | Matsuhara | G03G 15/5091 399/80 |
| 2007/0003308 A1 | 1/2007 | Kim | |
| 2007/0206210 A1* | 9/2007 | Miyazaki | G06F 3/1288 358/1.14 |
| 2007/0273924 A1* | 11/2007 | Ozawa | G06F 3/1212 358/1.15 |
| 2007/0296998 A1* | 12/2007 | Iwamoto | G06F 21/606 358/1.14 |
| 2008/0126860 A1 | 5/2008 | Sampath et al. | |
| 2010/0195144 A1* | 8/2010 | Kawai | G06F 3/1222 358/1.15 |
| 2014/0036311 A1* | 2/2014 | Sato | G06F 3/1211 358/1.15 |
| 2016/0378406 A1* | 12/2016 | Kaku | G06F 3/1291 358/1.15 |
| 2018/0267752 A1 | 9/2018 | Nishiwaki et al. | |

FOREIGN PATENT DOCUMENTS

| | | | | |
|---|---|---|---|---|
| JP | 2011051251 A | 3/2011 | | |
| JP | 2011060045 A | 3/2011 | | |
| JP | 2011090599 A | 5/2011 | | |
| JP | 2013208837 A | 10/2013 | | |
| JP | 2017191147 A | * | 10/2017 | G06Q 30/04 |

* cited by examiner

RESUMING PRINT JOB BY USING ACCOUNTING INFORMATION

BACKGROUND

An image forming apparatus refers to an apparatus that prints printing data generated at a terminal apparatus, such as a computer, on a recording medium, such as paper. Examples of an image forming apparatus include a copier, a printer, a facsimile, a scanner, or a multi-function printer (MFP) which multiply implements functions of the aforementioned apparatuses through one apparatus, etc.

In some situations, it is useful for a user to perform a printing job by using an image forming apparatus installed in a public space.

DETAILED DESCRIPTION OF EXAMPLES

Hereinafter, various examples will be described with reference to the accompanying drawings. The examples described below may be implemented while being modified into several different forms. Also, with respect to matters that are widely known to those of ordinary skill in the art to which the following examples belong, a detailed explanation will be omitted.

In the following description, an element that is described as "connected to" another element may be interpreted to include both the case in which the element is directly connected to the other element, and the case in which the element is connected to the other element through still another element. Also, an element that is described to "include" another element can be interpreted to mean that other elements may additionally be included, but not that other elements are excluded, unless there is a description to the contrary.

The term "image forming job" may refer to various kinds of jobs (e.g., printing, copying, scanning, or faxing) related to an image such as formation of an image or generation/storing/transmission of an image file, etc. Also, the term "job" may not only refer to an image forming job, but also include any of a process or a series of processes necessary for performing an image forming job.

A "server" may refer to an apparatus that provides information or services to a client through a network. As examples of such a server, there are payment servers, management servers, etc. In addition, a service may be provided at a physical server, or at a virtual server dividing a physical server.

An "image forming apparatus" may refer to an apparatus that prints printing data generated at a terminal apparatus, such as a computer, on a recording medium, such as paper. As examples of such an image forming apparatus, there is a copier, a printer, a facsimile, a scanner, and a multi-function printer (MFP) that multiply implements functions of the aforementioned apparatuses through one apparatus, etc.

The term "hard copy" may refer to an operation of outputting an image on a printing medium such as paper, etc., and the term "soft copy" may refer to an operation of outputting an image on a display apparatus like a television (TV), a monitor, etc. or outputting an image to a memory.

The term "printing data" may refer to data converted into a printable format on a printer. In an example, if a printer supports direct printing, a file itself may become printing data.

A "user" may refer to a person who performs operations related to an image forming job by using an image forming apparatus, or a device connected to an image forming apparatus in a wired or wireless manner. A "manager" may refer to a person who has authority to access all functions and the system of an image forming apparatus. A "manager" and a "user" may be the same person.

Figure 1:
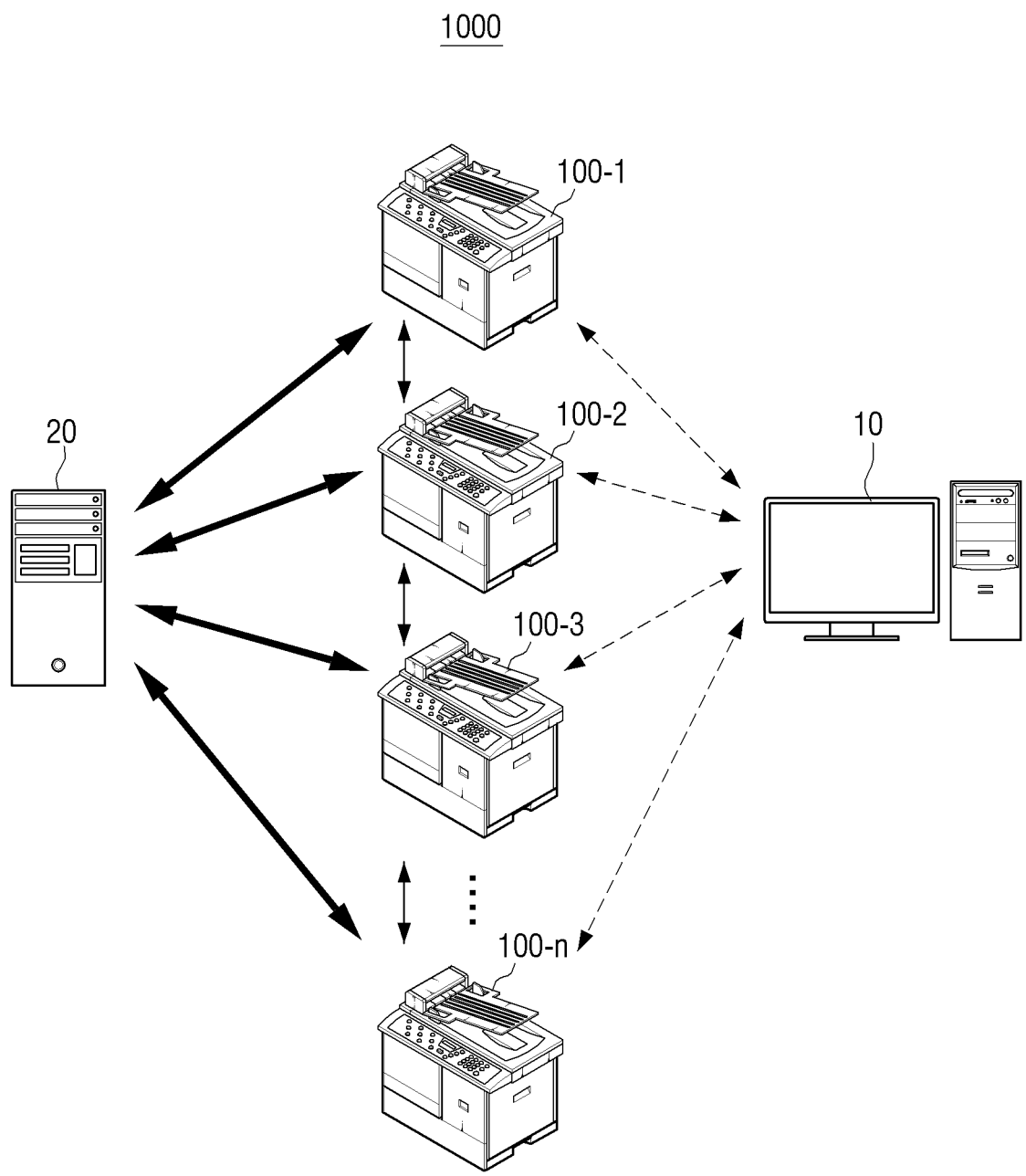
FIG. 1 is a diagram illustrating an image forming system according to an example.

FIG. 1 is a diagram illustrating an image forming system according to an example.

Referring to FIG. 1, an image forming system 1000 may include a user terminal apparatus 10, a server 20, and a plurality of image forming apparatuses 100-1, 100-2, 100-3, . . . , 100-*n*.

The user terminal apparatus 10 may output printing data by using the image forming apparatus 100. For example, the user terminal apparatus 10 may transmit printing data to the image forming apparatus 100 to perform a printing job.

In an example, the user terminal apparatus 10 may be notified of a job ID, corresponding to printing data, transmitted from the image forming apparatus 100. Here, the job ID may be a unique value for identifying a printing job that a user wishes to proceed. In an example, the job ID may be a random value, or a value generated based on the user terminal apparatus 10 or a user's information. The job ID may be referred to as a pin number, an output number, a unique output identification number, etc.

The user may move to a specific image forming apparatus 100 for a printing job, and input the notified job ID into the image forming apparatus 100. Hereinafter, an example will be described in which the user moved to the first image forming apparatus 100-1.

The first image forming apparatus 100-1 may display a user interface (UI) for receiving a job ID and receive the job ID through the UI.

The first image forming apparatus 100-1 that received the job ID may determine whether printing data corresponding to the job ID was stored in advance.

In a case in which printing data corresponding to the job ID was stored in advance, the first image forming apparatus 100-1 may perform accounting based on page information of the stored printing data. For example, the first image forming apparatus 100-1 may determine an accounting amount based on page information, and request accounting payment to the server 20 based on the determined accounting amount.

If the first image forming apparatus 100-1 is notified from the server 20 that accounting was completed, the first image forming apparatus 100-1 may perform a printing job.

If a printing job is completed at the first image forming apparatus 100-1 without occurrence of an error, the printing job requested by the user is completed, and the first image forming apparatus 100-1 may store a history for the performed printing job.

If an error occurred during the printing process, the first image forming apparatus 100-1 may display a notification that an error occurred or notify the user terminal apparatus 10 that an error occurred. In an example, the notification may include information that the printing job can be resumed by using another image forming apparatus 100-2, 100-3, . . . , 100-n.

For example, in a case in which the first image forming apparatus 100-1 stores information on surrounding image forming apparatuses (e.g., location information, function information, etc.), the notification may include information on an image forming apparatus that is able to process a job that the user currently requested and location information of the image forming apparatus. The notification may also provide for the user to select the image forming apparatus that is able to process the requested job. In an example, a nearby image forming apparatus may be preferentially displayed.

In an example, status information of surrounding image forming apparatuses may be received, and notification of other image forming apparatuses may be provided in consideration of whether an error occurred in the surrounding image forming apparatuses, the amount of pending jobs of the surrounding image forming apparatuses, etc.

Based on the provision of information as above, in a case in which the user moved to the second image forming apparatus 100-2, and input a job ID corresponding to a printing job wherein an error occurred, the second image forming apparatus 100-2 determines whether printing data corresponding to the input job ID was stored in advance.

As printing data corresponding to the printing job is stored in the first image forming apparatus 100-1, the second image forming apparatus 100-2 may identify that printing data corresponding to the job ID is not stored. Accordingly, the second image forming apparatus 100-2 may search other image forming apparatuses 100-1, 100-3, . . . , 100-n having printing jobs corresponding to the job ID. For this, each of the image forming apparatuses 100-1, 100-2, 100-3, . . . , 100-n may have stored address information (i.e., IP addresses) of other image forming apparatuses.

If it is determined that the first image forming apparatus 100-1 stores printing data corresponding to the job ID, the second image forming apparatus 100-2 may request the first image forming apparatus 100-1 to provide information related to the printing job and receive the information. Accordingly, the second image forming apparatus 100-2 may receive proceeding history information, accounting information, and printing data from the first image forming apparatus 100-1.

In an example, the proceeding history information may be proceeding history at the first image forming apparatus 100-1 for the printing job. The proceeding history information may include information on pages (e.g., a number of pages) of which printing was performed among the entire pages of the job (e.g., total number of pages in the printing job) with respect to printing data or information on pages of which printing was not performed.

In an example, accounting information may include information as to whether payment for the printing job was made, or an accounting code that can authenticate payment, a payment number, etc. Such accounting information may be referred to as payment information, authentication information, payment history, etc.

The second image forming apparatus 100-2 that received information related to the printing job may determine whether accounting (e.g., payment, refund, etc.) for the printing job is needed. For example, the second image forming apparatus 100-2 may determine whether additional accounting for the printing job is needed based on the received accounting information.

If, as a result of the determination, additional accounting is not needed, the second image forming apparatus 100-2 may print remaining pages of which printing was not performed among printing data, without performing additional accounting processing.

In contrast, in a case in which the accounting units of the first image forming apparatus 100-1 and the second image forming apparatus 100-2 are different, or applicable printing options are different, and thus additional accounting (e.g., additional payment, partial refund, etc.) is needed, the second image forming apparatus 100-2 may perform accounting processing. For example, in a case in which a color printing job is performed at the first image forming apparatus 100-1 at 100 Korean won per page, but color printing is impossible at the second image forming apparatus 100-2, and thus a printing job has to be performed at 50 Korean won per page, accounting processing of refunding the difference for the remaining pages may be performed.

In an example, if the printing job is completed at the second image forming apparatus 100-2 without an additional error, the second image forming apparatus 100-2 may store history for the printing job performed at the second image forming apparatus 100-2.

In contrast, if an error also occurred at the second image forming apparatus 100-2, information on other image forming apparatuses that can perform additional jobs may be provided, similar to the operation at the first image forming apparatus 100-1 described above.

In an image forming system according to an example, if an error occurred during a printing job, the affected printing job can be processed at another image forming apparatus, and thus user convenience is improved. Further, as accounting information is also provided to another image forming apparatus, the remaining printing job can be resumed without complex processing procedures such as accounting refund or re-accounting processing at another apparatus.

In the example of FIG. 1, it was illustrated and described that at the time of occurrence of an error, printing data, proceeding history information, etc. are transmitted by communication among image forming apparatuses 100. However, the image forming system 1000 may further include a management server to manage a plurality of image forming apparatuses 100. In a case in which a management server is included in the image forming system 1000, the aforementioned printing data, proceeding history information, etc. may be provided to the image forming apparatus 100 through the management server. An example of such an operation will be described below with reference to FIG. 5.

Also, in the example of FIG. 1, it was described that the image forming apparatus 100 generates a unique job ID. However, in other examples, a unique job ID may be generated at the user terminal apparatus 10, or it may be generated at a management server managing a plurality of image forming apparatuses.

In an example, the image forming system as described above may be applied not only to printing jobs, but also to scanning jobs, fax transmission jobs, copying jobs, etc.

Figure 2:
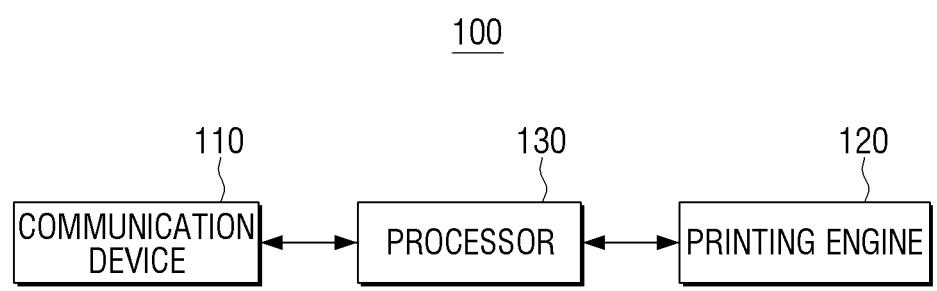
FIG. 2 is a block diagram illustrating a configuration of an image forming apparatus according to an example.

FIG. 2 is a block diagram illustrating a configuration of an image forming apparatus according to an example.

Referring to FIG. 2, the image forming apparatus 100 may include a communication device 110, a printing engine 120, and a processor 130.

The communication device 110 may be connected to a user terminal apparatus 10 and may receive printing data from the user terminal apparatus 10. Here, the user terminal apparatus 10 may be an electronic apparatus to provide printing data. As an example, the user terminal apparatus 10 may be a personal computer (PC), a laptop computer, a tablet PC, a smartphone, a server, etc. In an example, in a case in which the image forming apparatus 100 can communicate with a management server 20-2 as in FIG. 5, the communication device 110 may receive printing data through the management server 20-2.

The communication device 110 may connect the image forming apparatus 100 with an external apparatus. In an example, the communication device 110 may be connected to an external apparatus through a local area network (LAN) and an Internet network, or may be connected through a universal serial bus (USB) port or a wireless communication (e.g., WiFi 802.11a/b/g/n, near field communication (NFC), Bluetooth) port. Also, such a communication device 110 may be referred to as a transceiver.

The communication device 110 may perform communication with the server 20, request accounting information from the server 20, and be notified of a result of accounting processing from the server 20.

The communication device 110 may request or receive information for a printing job. In an example, in a case in which the image forming apparatus 100 can communicate with the management server 20-2 as in FIG. 5, the communication device 110 may request information for a printing job or receive information for a printing job through the management server 20-2.

Figure 5:
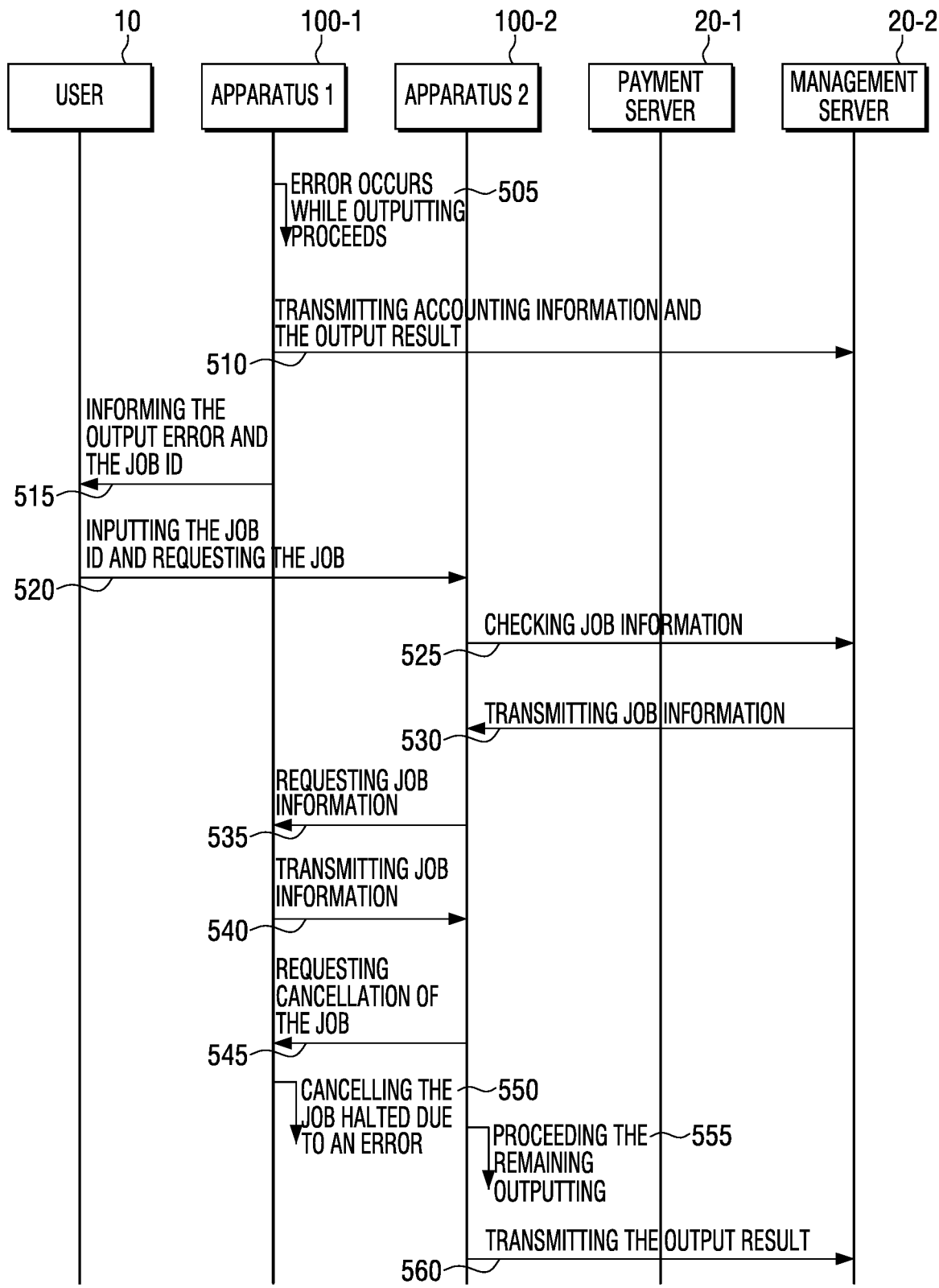
FIG. 5 is a sequence diagram illustrating an operation of transferring a printing job according to an example.

In a case in which the image forming apparatus 100 can communicate with the management server 20-2 as in FIG. 5, the communication device 110 may transmit information on printing history to the management server 20-2.

In an example, if an error occurs, the communication device 110 may notify the manger (for example, a terminal apparatus corresponding to the manger, an e-mail address of the manager, etc.) of the fact that an error occurred.

The printing engine 120 may perform a printing job. For example, the printing engine 120 may perform a printing job by using at least one method among dot-jet, inkjet, laser printing, or the like.

The processor 130 may control a component inside the image forming apparatus 100. In an example, the processor 130 may include a single device such as a central processing unit (CPU) or an application specific integrated circuit (ASIC), or it may include a plurality of devices such as a CPU, an image processor, etc.

When printing data is received from the user terminal apparatus 10, the processor 130 may generate a unique job ID corresponding to the received printing data and control the communication device 110 such that the generated job ID is notified to the user terminal apparatus 10.

When a printing request for a printing job is received, the processor 130 may determine whether printing data corresponding to the requested printing job was stored in advance. For example, the processor 130 may determine whether printing data corresponding to the unique ID corresponding to the printing job was received earlier.

If it is determined that printing data was stored in advance, the processor 130 may perform accounting based on page information of the printing data. For example, the processor 130 may determine the accounting amount based on the number of pages to be printed and the standard for accounting per page (e.g., cost per page), and request accounting for the determined accounting amount to the server 20.

When completion of accounting for the requested accounting is notified from the server 20, the processor 130 may control the printing engine 120 such that printing for the printing data is performed. For example, the processor 130 may perform rendering for the printing data, and perform a printing job for the rendered data by using the printing engine 120.

If the printing job is completed at the first image forming apparatus 100-1 without occurrence of an error, the processor 130 may control the communication device 110 to notify the user terminal apparatus 10 that the printing job was completed. If the processor 130 is connected to the management server 20-2 as illustrated in FIG. 5, the processor 130 may control the communication device 110 such that a history for the printing job is transmitted to the management server 20-2.

During a printing job as above, if a quantity of available printing sheets (e.g., paper) is insufficient, an amount of available toner is insufficient, or a jam occurs such that it becomes difficult to process the printing job at the image forming apparatus 100, the processor 130 may control the communication device 110 to notify the user terminal apparatus 10 of the fact that an error occurred or of the difficulty in processing the printing job. Here, the processor 130 may also provide information that the printing job can be resumed using another image forming apparatus 100-2, 100-3, . . . , 100-n.

In a case in which the user moved to another image forming apparatus (e.g., the image forming apparatus 100-2) based on provision of information as above and input a job ID, proceeding history information and accounting information for the job ID are requested by the other image forming apparatus 100-2. When such information is requested, the processor 130 may control the communication device 110 such that proceeding history information and accounting information for the job ID are transmitted to the image forming apparatus 100-2 that transmitted the request.

Hereinafter, an example operation of the processor 130 in the case of receiving a user request for a printing job which has a history of occurrence of an error will be described.

When a printing request for a printing job is received, the processor 130 may determine whether information related to the printing job is stored in another image forming apparatus. For example, if printing data corresponding to a job ID requested by a user is not stored, the processor 130 may determine that the job is a printing job which has history of having been performed at another image forming apparatus 100-2, and search an apparatus having printing data of the job ID among other image forming apparatuses. Here, the processor 130 may search an image forming apparatus wherein an error occurred first, and determine whether the image forming apparatus wherein the error occurred has the proceeding history of the job ID.

For such a search process, address information (i.e., an IP address) of another image forming apparatus stored in advance in the image forming apparatus 100 may be used. If the image forming apparatus 100 may be connected to the management server 20-2 as illustrated in FIG. 5, the processor 130 may control the communication device 110 such that a job ID is transmitted to the management server 20-2, and search another image forming apparatus having printing data of the job ID through a response of the management server 20-2.

In an example, the processor 130 may control the communication device 110 to request information on a job corresponding to the printing job to another image forming apparatus storing information related to the printing job. Here, information on a job may be the aforementioned proceeding history information, accounting information, or printing data.

Accordingly, the processor 130 may determine whether accounting processing for the requested printing job was performed at another image forming apparatus based on the received accounting information. For example, the processor 130 may determine whether additional accounting is needed in performing a job requested by a user based on accounting information, and in a case in which accounting processing for the printing job was already performed at another image forming apparatus 100-1, the processor 130 may control the printing engine 120 such that the remaining printing job that was not performed at the other image forming apparatus is performed.

For example, in a case in which the processor 130 received proceeding history information that printing of pages 1-4 proceeded at the previous image forming apparatus regarding a printing job for 10 pages, the processor 130 may perform printing for the remaining 5-10 pages among the printing data.

In an example, the processor 130 may perform a printing job using printing options applied at the previous image forming apparatus 100-1. For example, in a case in which a printing job was performed in the order of pages at the previous image forming apparatus 100-1, the processor 130 may perform a printing job in the same manner. Also, in a case in which printing of the previous job was performed using sheets of B5 paper, the processor 130 may perform a printing job using sheets of B5 paper.

If a printing option applied at the previous image forming apparatus 100-1 cannot be applied, the processor 130 may provide information in that regard to a user. For example, the processor 130 may display that the previous option cannot be applied by using the display 140 in FIG. 3, or control the communication device 110 such that the information is transmitted to the user terminal apparatus 10.

In a case in which the image forming apparatus 100 can communicate with the management server 20-2 as in FIG. 5, if a printing request for a printing job is received, the processor 130 may request printing data corresponding to the requested printing job to the management server 20-2 and receive the data. Also, if the processor 130 does not receive separate accounting information related to the printing data from the management server 20-2, the processor 130 may identify that the printing data is initial printing data, and if the processor 130 receives accounting information together with the printing data, the processor 130 may identify that there is printing history at another image forming apparatus.

In the above examples, only certain components constituting an image forming apparatus have been illustrated and described. However, various components may be additionally included. An example in this regard will be made with reference to FIG. 3.

Figure 3:
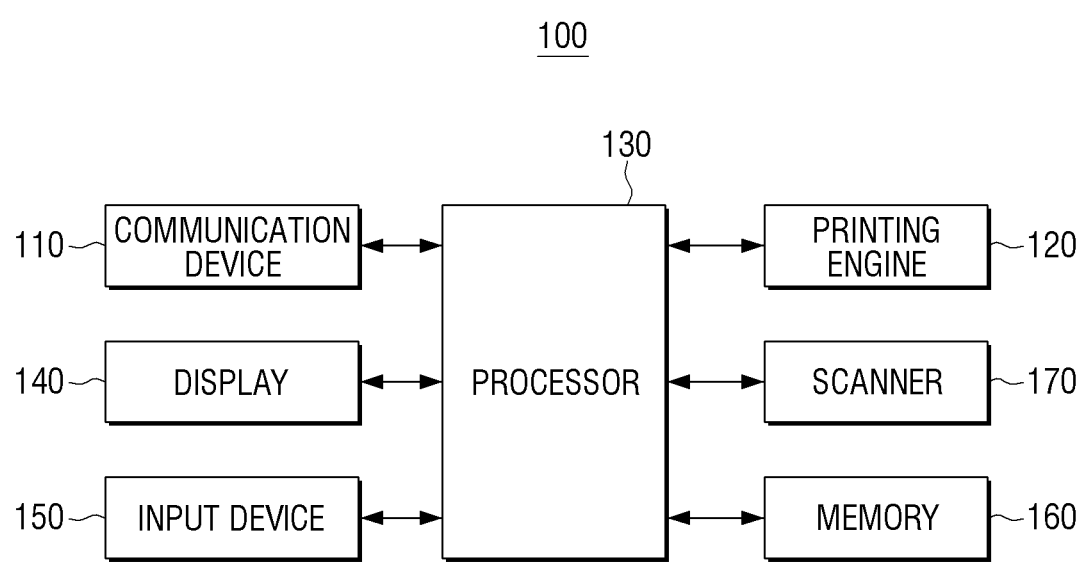
FIG. 3 is a block diagram illustrating a more detailed configuration of an image forming apparatus according to an example.

FIG. 3 is a block diagram illustrating a more detailed configuration of an image forming apparatus according to an example.

Referring to FIG. 3, the image forming apparatus 100 may include a communication device 110, a printing engine 120, a processor 130, a display 140, an input device 150, a memory 160, and a scanner 170.

As descriptions regarding the communication device 110 and the printing engine 120 were made with reference to FIG. 2, overlapping descriptions will be omitted. Also, as a description regarding the processor 130 was made with reference to FIG. 2, the content described in FIG. 2 will not be repetitively described, but only the content related to the components added in FIG. 3 will be described below.

The display 140 may display various information provided at the image forming apparatus 100. For example, the display 140 may display a user interface window for receiving selection of various functions provided by the image forming apparatus 100.

In addition, the display 140 may display a user interface window for receiving input of a job ID.

In a case in which an error occurred, the display 140 may display information notifying that the error occurred. Here, regarding the current job, the display 140 may display information notifying that resuming of the job is possible by using another image forming apparatus, and may display information (e.g., a map, an identifier, etc.) of the other image forming apparatus that can resume the job.

In an example, the display 140 may display an accounting amount, or information on a proceeding status of accounting, a proceeding status of printing, etc.

The input device 150 may receive a selection of a function and a control command for the function from a user. Here, the function may include a printing function, a copying function, a scanning function, a fax transmission function, etc. Such a function control command may be input through a control menu displayed on the display 140.

The input device 150 may be implemented as a plurality of buttons, a keyboard, a mouse, etc., and it may also be implemented as a touch screen that can perform the aforementioned functions of the display 140 simultaneously.

In an example, the input device 150 may receive input of a printing job. For example, the input device 150 may receive input of a unique job ID. Also, the input device 150 may receive input of information (e.g., an authentication token) for accounting.

The memory 160 may store printing data. For example, the memory 160 may store printing data received from the communication device 110, and store a rendering image for the received printing data. The memory 160 may be implemented not only as a storage medium inside the image forming apparatus 100, but also as an external storage medium, a removable disk including a USB memory, a web server through a network, etc.

In an example, the memory 160 may store information on surrounding image forming apparatuses 100. Here, information on surrounding image forming apparatuses 100 may include address information (e.g., an Internet Protocol (IP) address), performance information, location information (e.g., a map), etc. In an example, address information may be information that a manager stored in advance, and it may be information provided at the management server 20-2 as illustrated in FIG. 5.

Also, the memory 160 may store proceeding history information for a printing job.

The scanner 170 may scan a manuscript and generate a scan image. For example, if the scanner 170 receives a request for a scanning job from a user, the scanner 170 may scan a manuscript.

If the processor 130 receives a request for a copying job from a user, the processor 130 may control the scanner 170 to scan a manuscript. In an example, the processor 130 may determine an accounting based on the number of pages of generated scan data.

In an example, if accounting for a copying job is completed, the processor 130 may control the printing engine 120 such that printing for the generated scan data is performed.

If an error occurs during a printing process, the processor 130 may generate a unique job ID for the copying job. The processor 130 may control the display 140 to display information notifying that the job can be resumed if the generated job ID is input into another image forming apparatus.

The processor 130 may store the generated scan data in the memory 160. If information for a job ID wherein an error occurred is requested from another image forming apparatus, the processor 130 may control the communication device 110 to transmit the stored scan data, proceeding history information, and accounting information.

As described above, if an error occurred during a printing job, an image forming apparatus may continuously process the halted printing job at another image forming apparatus, and thus user convenience is improved. Further, as accounting information is also provided to another image forming apparatus, the remaining printing job can be resumed without complex processing procedures such as accounting refund or re-accounting processing at another apparatus.

In FIGS. 1 to 3, it was described that for one printing job, two apparatuses perform one printing job. However, if only accounting was performed and no printing job occurred at the first image forming apparatus 100-1, a printing job may be performed only at the second image forming apparatus 100-2.

Figure 4:
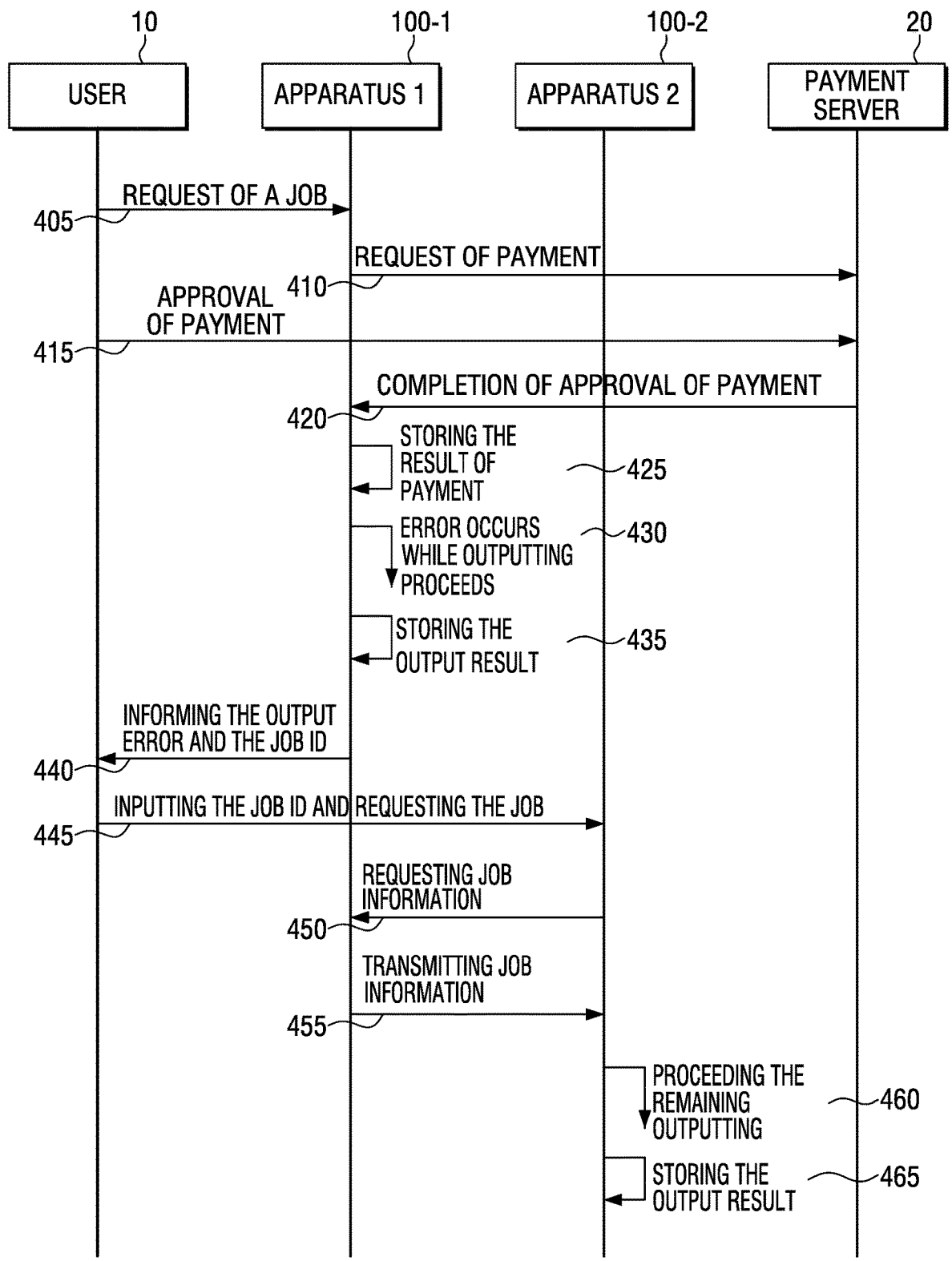
FIG. 4 is a sequence diagram illustrating an operation of transferring a printing job according to an example.

FIG. 4 is a sequence diagram illustrating an operation of transferring a printing job according to an example. The illustrated example refers to a method of transferring a job in a case a management server is not used.

Referring to FIG. 4, an example will be described in which printing data was provided to the first image forming apparatus 100-1 in advance, and each image forming apparatus 100-1, 100-2 stores address information of different image forming apparatuses.

If a user terminal apparatus 10 requests a job for printing data at the first image forming apparatus 100-1 at operation 405, the first image forming apparatus 100-1 may determine an accounting amount, and request accounting (e.g., payment) for the determined accounting amount to the payment server 20 at operation 410.

In response to a request for accounting as described above, the payment server 20 may request approval of payment for the printing job to the user terminal apparatus 10, and if the user approves payment regarding the request at operation 415, the payment server 20 may notify the first image forming apparatus 100-1 that accounting payment was completed at operation 420. Here, accounting may be performed by various methods such as a card payment method, a fintech payment method, etc., and payment may be requested to different payment servers for each payment method.

When completion of payment is notified, the first image forming apparatus 100-1 may store the payment result at operation 425 and perform the printing job.

If an error occurs during a printing job at operation 430, the first image forming apparatus 100-1 may store the output result (i.e., printing proceeding history) for the current printing job at operation 435, and notify the user about the job ID along with the output error at operation 440. For example, the first image forming apparatus 100-1 may display a notification that an error occurred and the job ID, or transmit the aforementioned information to the user terminal apparatus 10.

Accordingly, if the user inputs the job ID on the second image forming apparatus 100-2 at operation 445, the second image forming apparatus 100-2 may request job information corresponding to the job ID to the first image forming apparatus 100-1 at operation 450, and in response thereto, receive proceeding history information, accounting information, and printing data at operation 455.

For example, the second image forming apparatus 100-2 that received input of the job ID may determine whether printing data corresponding to the input job ID was stored in advance. If it is determined that printing data corresponding to the job ID is not stored, the second image forming apparatus 100-2 may request information corresponding to the job ID to the image forming apparatus 100-1 and receive proceeding history information, accounting information, and printing data as mentioned above. Here, address information of the image forming apparatus 100-1 may have been stored in the second image forming apparatus 100-2 in advance.

The second image forming apparatus 100-2 that received printing data may determine whether additional accounting is needed based on the received proceeding history information and accounting information, and if additional accounting is not needed, the second image forming apparatus 100-2 may resume printing for the remaining pages for which printing was not performed based on history information at operation 460.

If the printing job is completed, the second image forming apparatus 100-2 may store the history of the job at operation 465.

In the example of FIG. 4, it was illustrated and described that only one payment server 20 is connected to a plurality of image forming apparatuses. However, the number of payment servers may vary according to the payment method.

FIG. 5 is a sequence diagram illustrating an operation of transferring a printing job according to an example. The illustrated example refers to an operation of resuming printing in the case of using a management server.

The operation at the first image forming apparatus 100-1 is as illustrated in FIG. 4. Accordingly, hereinafter, an operation after an error occurred at the first image forming apparatus 100-1 will be described.

Referring to FIG. 5, if an error occurs during a printing job at the first image forming apparatus 100-1 at operation 505, the first image forming apparatus 100-1 may transmit accounting information and the output result (i.e., proceeding history information) to the management server 20-2 at operation 510.

The first image forming apparatus 100-1 may notify the user about the job ID along with the output error at operation 515.

Accordingly, if the user inputs the job ID on the second image forming apparatus 100-2 at operation 520, the second image forming apparatus 100-2 may request job information corresponding to the input job ID to the management server 20-2 at operation 525. Here, the job information may include address information and accounting information of an image forming apparatus that has history information of processing a printing job corresponding to the job ID.

In an example, the management server 20-2 may include a server that manages operation statuses and job history of a plurality of image forming apparatuses 100-1, 100-2, and may store address information, performance information, job history information, accounting information, etc. of each of the plurality of image forming apparatuses 100-1, 100-2.

In response to the request for the aforementioned job information, the management server 20-2 may transmit information on the first image forming apparatus 100-1 (e.g., the job ID, IP address, accounting information) to the second image forming apparatus 100-2 at operation 530.

The second image forming apparatus 100-2 may transmit the job ID to the first image forming apparatus 100-1 based on the received information and request information corresponding to the job ID at operation 535. In response thereto, the second image forming apparatus 100-2 may receive job information and printing data including proceeding history information and accounting information at operation 540.

In an example, the second image forming apparatus 100-2 may request cancellation of a printing job corresponding to the job ID to the first image forming apparatus 100-1 at operation 545, and in response thereto, the first image forming apparatus 100-1 may cancel the printing job at operation 550. In an example, the printing job may be cancelled automatically in response to transfer of job information without a request by the second image forming apparatus 100-2.

The second image forming apparatus 100-2 that received job information may proceed the remaining job for which printing was not performed at operation 555. When the printing job is completed, the second image forming apparatus 100-2 may transmit history information for the performed job to the management server 20-2 at operation 560.

In the example of FIG. 5, it was illustrated and described that the second image forming apparatus 100-2 receives only accounting information and address information of the first image forming apparatus from the management server 20-2 and receives proceeding history information from the first image forming apparatus 100-1. However, the second image forming apparatus 100-2 may be implemented in the form of receiving all information such as address information, accounting information, proceeding history information, printing data, etc. of the first image forming apparatus 100-1 from the management server 20-2, or in the form of receiving only address information of the first image forming apparatus 100-1 from the management server 20-2, and receive the remaining information directly from the first image forming apparatus 100-1.

Figure 6:
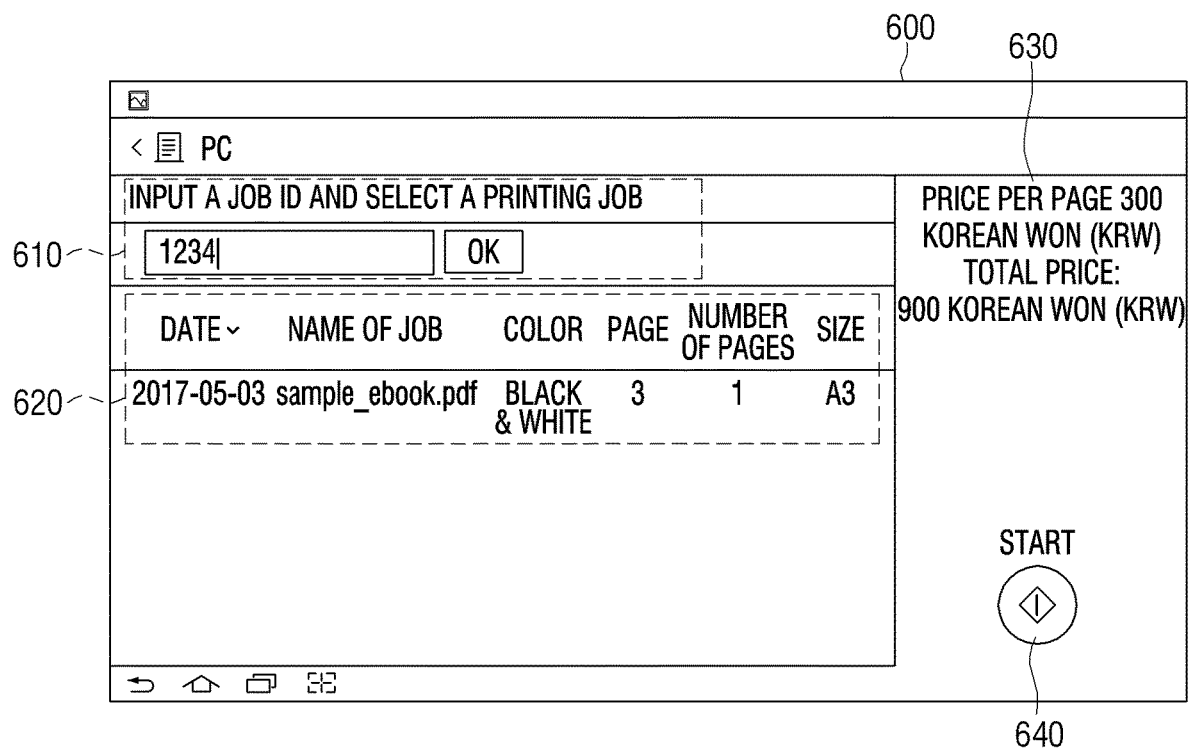
FIG. 6 is a diagram illustrating a user interface window displayed on a display according to an example.

FIG. 6 is a diagram illustrating a user interface window displayed on a display according to an example.

Referring to FIG. 6, the user interface window 600 may include a first area 610 for receiving input of a job ID, a second area 620 for displaying a search result, a third area 630 for displaying an accounting amount, and an execution area 640.

The first area 610 is an area for receiving input of a job ID from a user. A user may input a job ID into the first area 610 and specify a printing job. In a case in which a job ID is input into the first area 610, the second area 620 may display information corresponding to the job ID, and the third area 630 may display the determined accounting amount for the job.

The second area 620 is an area for displaying job information corresponding to the input job ID. In an example, in a case in which there is history that some printing for the job ID that a user input was performed at another image forming apparatus, information on the number of the remaining pages among the entire pages, etc. may be displayed, and a content that additional accounting is not needed may also be displayed.

The third area 630 is an area for displaying the determined accounting amount for a selected job. For example, the third area 630 may display the unit price per page and the determined cost together.

The execution area 640 is an area that for receiving a request for performing a job, When a user chooses the execution area 640, accounting processing for the accounting amount displayed in the third area 630 may be performed.

Figure 7:
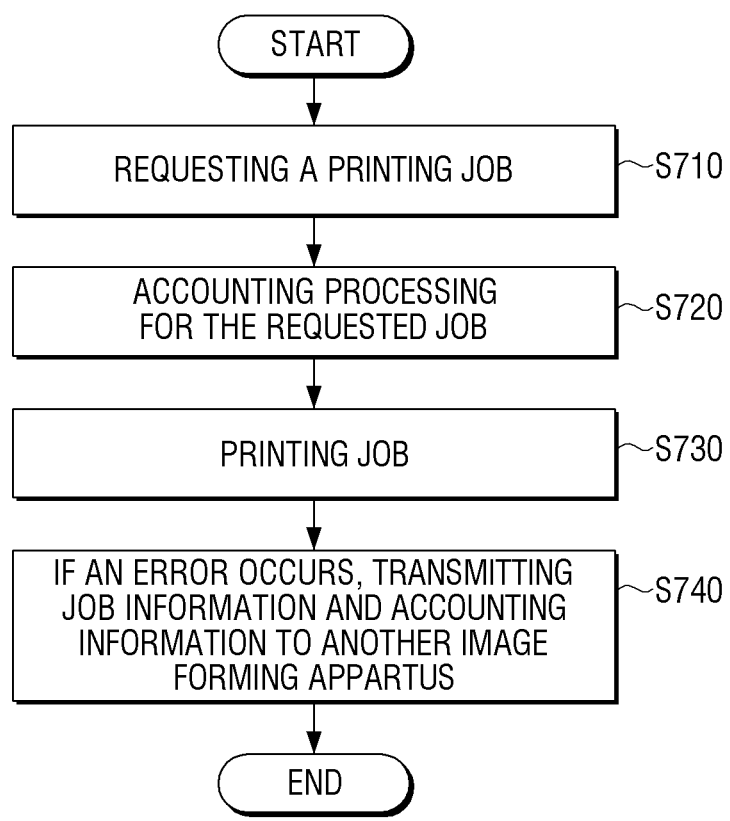
FIG. 7 is a flowchart illustrating an image forming method according to an example.

FIG. 7 is a flowchart illustrating an image forming method according to an example.

Referring to FIG. 7, when a printing request for a printing job is received at operation S710, accounting processing for the received printing job is performed at operation S720. For example, an image forming apparatus may determine an accounting amount corresponding to the received printing job, and request payment for the determined accounting amount to the server. When information that accounting was completed is received from the server, the image forming apparatus may perform an operation as below.

The image forming apparatus may perform a printing job corresponding to the printing request at operation S730. For example, the image forming apparatus may perform a printing job by using printing data received from a user terminal apparatus. Here, printing data may be directly received through a user terminal apparatus, and it may also be received through a management server.

In an example, if an error occurs in a printing process for the printing job, the image forming apparatus may transmit proceeding history information and accounting information of the printing job to another image forming apparatus at operation S740. For example, if an error for the printing job occurs, the image forming apparatus may display that resuming of the job by using another image forming apparatus is possible. In an example, the image forming apparatus may not display the information, but the information may be displayed on a user terminal apparatus. In an example, in a case in which the image forming apparatus is connected to a management server, the aforementioned proceeding history information and accounting information may be transmitted through the management server.

In a case in which the user moves to another image forming apparatus in response to an operation as above, and requests resuming of printing (i.e., in a case in which the user inputs a job ID corresponding to a printing job wherein an error occurred into another image forming apparatus), the other image forming apparatus requests information on the printing job to the image forming apparatus wherein an error occurred. If the image forming apparatus receives a request for such information on the printing job, the image forming apparatus may transmit proceeding history information and accounting information to the other image forming apparatus.

An example operation of the image forming apparatus that resumes a job wherein an error occurred, i.e., the aforementioned other image forming apparatus will be described with reference to FIG. 8 below.

Figure 8:
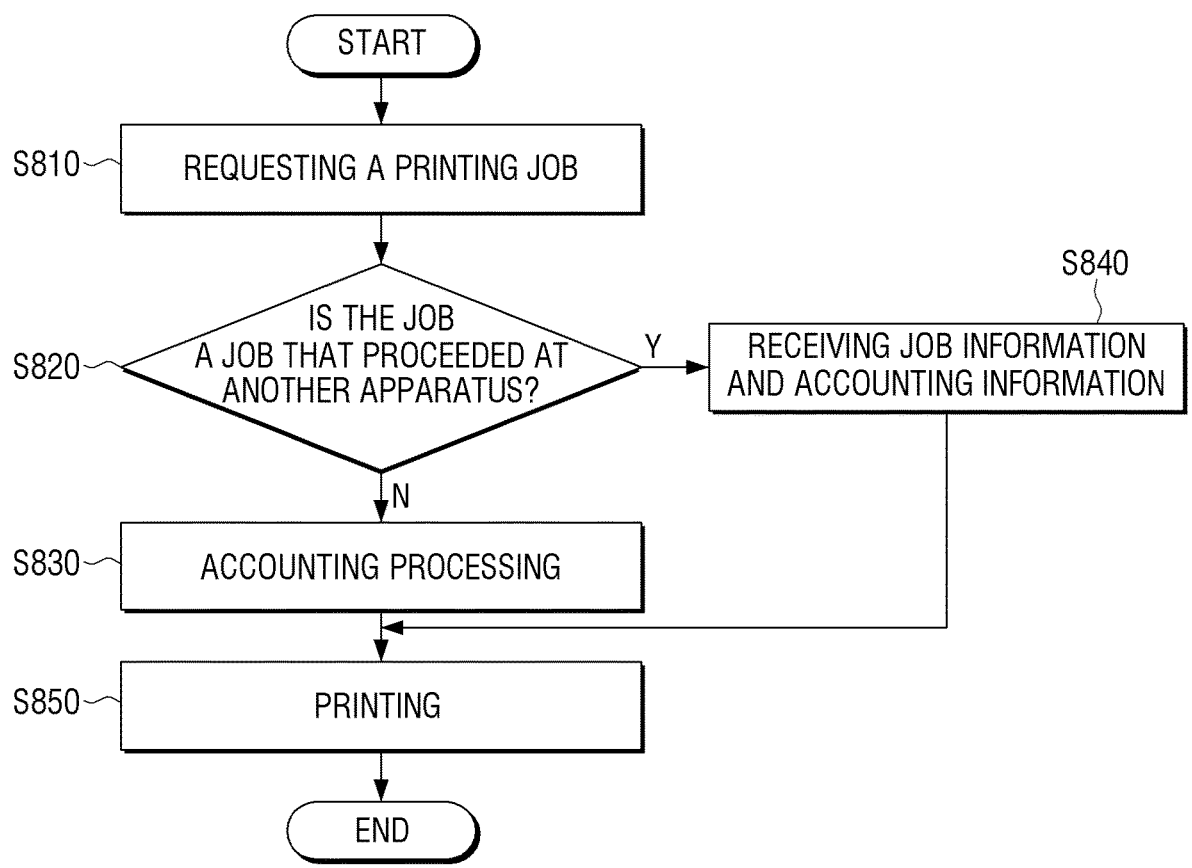
FIG. 8 is a flowchart illustrating an image forming method according to an example.

FIG. 8 is a flowchart illustrating an image forming method according to an example.

Referring to FIG. 8, if a printing request for a printing job is received at operation S810, an image forming apparatus determines whether the received printing job is a job that proceeded at another apparatus at operation S820. For example, the image forming apparatus may determine whether printing data corresponding to a job ID that a user input was stored in advance, and if printing data was stored in advance, the image forming apparatus may determine that the printing job is a new job. If printing data was not stored in advance, the image forming apparatus may determine whether a printing job corresponding to the job ID was performed at another image forming apparatus.

If, as a result of such determination, the printing job is a new job, the image forming apparatus may perform accounting processing for the printing job at operation S830 and proceed with the printing job at operation S850.

In contrast, in a case in which there is history that the printing job that the user requested was performed at another image forming apparatus, the image forming apparatus requests job information and accounting information to the other image forming apparatus and receives the information at operation S840.

Based on the received accounting information, if accounting processing for the printing job is not necessary, the image forming apparatus may resume the subsequent job for the pages for which the job was not performed, without an additional accounting procedure at operation S850.

As described above, in an example image forming method, if an error occurred during a printing job, the halted printing job can be continuously processed at another image forming apparatus, and thus user convenience is improved. Further, as accounting information is also provided to another image forming apparatus, the remaining printing job can be resumed without complex processing procedures such as accounting refund or re-accounting processing at another apparatus.

The aforementioned image forming method may be implemented as a program and provided to an image forming apparatus. As an example, a program including an image forming method may be stored in a non-transitory computer readable medium and provided. Here, a non-transitory computer readable medium may be a compact disc (CD), a digital video disc (DVD), a hard disk drive (HDD), a solid state drive (SSD), a blue-ray disc, a USB memory, a memory card, a read-only memory (ROM), etc.

While examples of the disclosure have been shown and described, the disclosure is not limited to the aforementioned examples. Rather, it is apparent that various modifications can be made by those having ordinary skill in the art to which the disclosure belongs, without departing from the gist of the disclosure as claimed by the appended claims, and such modifications are within the scope of the descriptions of the claims.

What is claimed is:

1. An image forming apparatus comprising:
a transceiver to communicate with an external apparatus;
a printing engine; and
a processor to:
based on receiving a printing request for a printing job, perform accounting processing, including an accounting amount and a request for payment, based on page information for the printing job and control the printing engine to perform the printing job in response to the completion of the accounting processing; and
based on an error occurring in the printing job, control the transceiver to transmit proceeding history information of the printing job and accounting information to another image forming apparatus,
wherein the other image forming apparatus is to use the accounting information to determine whether additional accounting is to be performed, wherein:
in response to an accounting amount of the other image forming apparatus being more than the accounting amount of the image forming apparatus, the other image forming apparatus determines an additional payment amount; and
in response to the accounting amount of the other image forming apparatus being less than the accounting amount of the image forming apparatus, the other image forming apparatus determines a refund amount.

2. The image forming apparatus of claim 1, wherein the processor is further to, based on receiving a request for information on the printing job from the other image forming apparatus, control the transceiver to transmit the proceeding history information and the accounting information to the other image forming apparatus.

3. The image forming apparatus of claim 1, wherein the proceeding history information includes at least one of a job ID, a number of output sheets of which printing was completed, or a total number of output sheets.

4. The image forming apparatus of claim 1, wherein the transceiver is further to receive printing data corresponding to the printing job from a user terminal apparatus or a server.

5. The image forming apparatus of claim 4, wherein the printing data includes a job ID corresponding to the printing job.

6. The image forming apparatus of claim 1, further comprising:
a memory to store printing data corresponding to the printing job, wherein the processor is further to control the transceiver to transmit the stored printing data to the other image forming apparatus.

7. The image forming apparatus of claim 1, further comprising:
a display to, based on the error occurring in the printing job, display information indicating that resuming of the printing job using the other image forming apparatus is possible.

8. The image forming apparatus of claim 1, wherein the processor is further to control the transceiver to transmit the proceeding history information of the printing job to a server.

9. The image forming apparatus of claim 1, wherein the processor is further to, based on receiving the printing request for the printing job, determine whether information related to the printing job is stored in the other image forming apparatus, and control the transceiver to request information on an operation corresponding to the printing job to the other image forming apparatus storing information related to the printing job.

10. The image forming apparatus of claim 9, wherein the processor is further to:
determine whether accounting processing of the requested printing job was performed at the other image forming apparatus based on received accounting information; and
based on accounting processing of the printing job having been already performed at the other image forming apparatus, control the printing engine such that a remaining printing job not performed at the other image forming apparatus is performed.

11. The image forming apparatus of claim 1, wherein the processor is to perform the accounting processing based on the page information by performing at least one of a card payment, a fintech payment, or requesting a payment server for payment.

12. The image forming apparatus of claim 1, wherein the processor is to perform the accounting processing based on the page information by determining a number of pages to be printed and an accounting amount per page.

13. The image forming apparatus of claim 1, wherein the printing request for a printing job includes a copy job including:
- generating a scan image of a manuscript, wherein the processor determines further accounting based on a number of pages of generated scan data; and
- printing a copy of the generated scan image of the manuscript.

14. The image forming apparatus of claim 13, wherein based on an error occurring in a printing process of the copy job the processor to:
- generate a unique job ID for the copy job;
- control the transceiver to transmit the unique job ID and accounting information to another image forming apparatus; and
- display information including the unique job ID.

15. A method of controlling printing at an image forming apparatus, the method comprising:
- based on receiving a printing request for a printing job, performing accounting processing, including an accounting amount and a request for payment, based on page information for the printing job;
- performing the printing job in response to the completion of the accounting processing; and
- based on an error occurring in the printing job, transmitting proceeding history information of the printing job and accounting information to another image forming apparatus,
- wherein the other image forming apparatus is to use the accounting information to determine whether additional accounting is to be performed, wherein:
  - in response to an accounting amount of the other image forming apparatus being more than the accounting amount of the image forming apparatus, determining, by the other image forming apparatus, an additional payment amount; and
  - in response to the accounting amount of the other image forming apparatus being less than the accounting amount of the image forming apparatus, determining, the other image forming apparatus, a refund amount.

16. The method of controlling printing of claim 15, wherein the transmitting comprises:
- based on receiving a request for information on the printing job from the other image forming apparatus, transmitting the proceeding history information and the accounting information to the other image forming apparatus.

17. The method of controlling printing of claim 15, further comprising:
- based on the error occurring in the printing job, displaying information indicating that resuming of the printing job using the other image forming apparatus is possible.

18. The method of controlling printing of claim 15, further comprising:
- based on receiving the printing request for the printing job, determining whether information related to the printing job is stored in the other image forming apparatus; and
- requesting information on an operation corresponding to the printing job to the other image forming apparatus storing information related to the printing job.

19. A non-transitory computer readable recording medium including instructions for executing a method of controlling printing, the non-transitory computer readable recording medium comprising:
- instructions to, based on receiving a printing request for a printing job, perform accounting processing, including an accounting amount and a request for payment, based on page information for the printing job;
- instructions to perform the printing job in response to the completion of the accounting processing; and
- instructions to, based on an error occurring in the printing job, transmit proceeding history information of the printing job and accounting information to another image forming apparatus,
- wherein the other image forming apparatus is to use the accounting information to determine whether additional accounting is to be performed, wherein:
  - in response to an accounting amount of the other image forming apparatus being more than the accounting amount of the image forming apparatus, the other image forming apparatus determines an additional payment amount; and
  - in response to the accounting amount of the other image forming apparatus being less than the accounting amount of the image forming apparatus, the other image forming apparatus determines a refund amount.

* * * * *